United States Patent [19]

Tsuchie

[11] Patent Number: 5,431,255
[45] Date of Patent: Jul. 11, 1995

[54] BRAKING DEVICE FOR BICYCLE

[76] Inventor: Kimihiro Tsuchie, 35-1, Kinugasa Tenjinmori-cho, Kita-ku, Kyoto-shi, Japan

[21] Appl. No.: 339,926

[22] Filed: Nov. 15, 1994

Related U.S. Application Data

[63] Continuation-in-part of Ser. No. 141,424, Oct. 20, 1993, abandoned, which is a continuation of Ser. No. 982,088, Nov. 25, 1992, abandoned.

[30] Foreign Application Priority Data

Dec. 16, 1991 [JP] Japan .................. 3-114177 U

[51] Int. Cl.⁶ .............. B62L 1/06; B62L 3/00; B62L 3/08
[52] U.S. Cl. .................. 188/24.16; 74/471 R; 74/502.4; 74/502.6; 188/2 D; 188/24.12
[58] Field of Search .............. 188/2 D, 24.11, 24.12, 188/24.16, 24.19, 24.21, 24.22, 24.13, 24.15, 204 R, 217; 303/9.61; 74/489, 500.5, 501.5 R, 501.6, 502.2, 502.4, 502.6, 551.8, 471 R, 502.5

[56] References Cited

U.S. PATENT DOCUMENTS

| | | | |
|---|---|---|---|
| 3,782,507 | 1/1974 | Shreve | 188/2 D |
| 4,057,127 | 11/1977 | Woodring | 188/2 D X |
| 4,480,720 | 11/1984 | Shimano | 188/24.15 |
| 4,644,816 | 2/1987 | Cockburn | 188/24.15 |
| 4,753,448 | 6/1988 | Nagashima | 188/2 D X |
| 4,770,435 | 9/1988 | Cristie | 188/24.12 X |
| 4,773,510 | 9/1988 | Sato | 188/2 D X |
| 4,901,595 | 2/1990 | Ozaki et al. | 188/2 D X |
| 5,094,322 | 3/1992 | Casillas | 188/2 D X |

FOREIGN PATENT DOCUMENTS

| | | | |
|---|---|---|---|
| 412494 | 10/1946 | Italy | 188/24.12 |
| 461244 | 9/1951 | Italy | 74/502.5 |
| 4-2588 | 1/1992 | Japan | 188/2 D |
| 2123501 | 2/1984 | United Kingdom | 188/24.16 |
| 2153460 | 8/1985 | United Kingdom | 188/24.16 |

Primary Examiner—Douglas C. Butler
Attorney, Agent, or Firm—Koda and Androlia

[57] ABSTRACT

A braking device for bicycle provided with two wire brake systems is disclosed. There is provided a relay amid outer tubes of both brakes to which divided ends of the outer tubes are connected and both continuous brake wires are fixed together inside the relay after individual adjustment. It is then possible to actuate the two brake systems simultaneously by manipulation of either brake lever and proper adjustment is feasible with ease for it can be done independently before fixing of both wires.

2 Claims, 3 Drawing Sheets

BRAKING DEVICE FOR BICYCLE

This is a continuation-in-Part of application Ser. No. 08/141,424, filed Oct. 20, 1993, now abandoned, which is a continuation of application Ser. No. 07/982,088, filed Nov. 25, 1992 now abandoned.

BACKGROUND OF THE INVENTION

1. Field of the Invention

The present invention relates to improvement of a braking device for bicycle wherein two braking systems can be actuated simultaneously by manipulation of a single brake lever.

2. Description of the Prior Art

As prior arts for simultaneous braking device for bicycle there are known, among others, Japanese Patent Publication No. 55 (1980)-22312 and No. 3 (1991)-23394. With each thereof two independent lines of brake wires are divided amid into four parts in total and each end thereof is connected to a movable plate.

Hitherto, it has been taken as preferable to have braking of the front wheel effected later than that of the rear wheel. In the aforementioned prior arts attempts were made for delaying braking of the front wheel such as providing a backlash for the connection between the wire and the movable plate. For that, however, it was necessary to first adjust either brake before adjusting the other brake with its stroke matched, this resulting in decrease of the wife's effective stroke. And this gave rise to a problem that it was then difficult to adjust the gap between the wheel and the brake shoe to be proper for both wheels. Such adjustment was extremely difficult when there were such factors as loosening of the connection with the moving plate, scattering in dimension of the parts involved, deformation of the wheels et cetera, these possibly resulting in failure of braking or of releasing thereof. Worse, with the wire divided into four, there resulted in increase of the number of the parts involved as well as of the man-hours required for assembly and also in relative increase in size of the movable plate which affected the aesthetic quality thereof.

It is the object of the present invention to solve such problems about the prior arts, that is, to provide a braking device with which adjustment of the gap between the wheel and the brake shoe is easy and which functions always satisfactorily. Another object of the invention is to provide a braking device with which braking of the front and rear wheel is effected simultaneously. A further object of the invention is to provide a braking device decreased in the number of parts involved or the man-hours required for assembly and improved in aesthetic quality.

In order to accomplish the aforementioned object, the braking device for bicycle of the present invention comprises two wire brake systems in which two brake wires are led from each brake lever through the outer tube to each brake and, when either brake lever is manipulated, the two brakes are actuated simultaneously. In such braking device there is provided an outer tube relay amid the outer tubes for both brakes for divided ends of the outer tubes to be connected thereto and a fixing means for fixing together two continuous brake wires leading from each brake lever to each brake inside the outer tube relay. The construction described above allows independent adjustment of each wire brake system before fixing together both brake wires, hence an effective stroke can be secured for each brake wire and each brake can be actuated without fail. Since the size of the outer tube relay suffices if it is enough for fixing together both brake wires, there is no problem of it being bulky to affect the aesthetic quality thereof. Also, such brake can be attached easily to an old bicycle in use.

DETAILED DESCRIPTION OF THE PREFERRED EMBODIMENT

A preferred embodiment will be described below with reference to the accompanied drawings.

Figure 1:
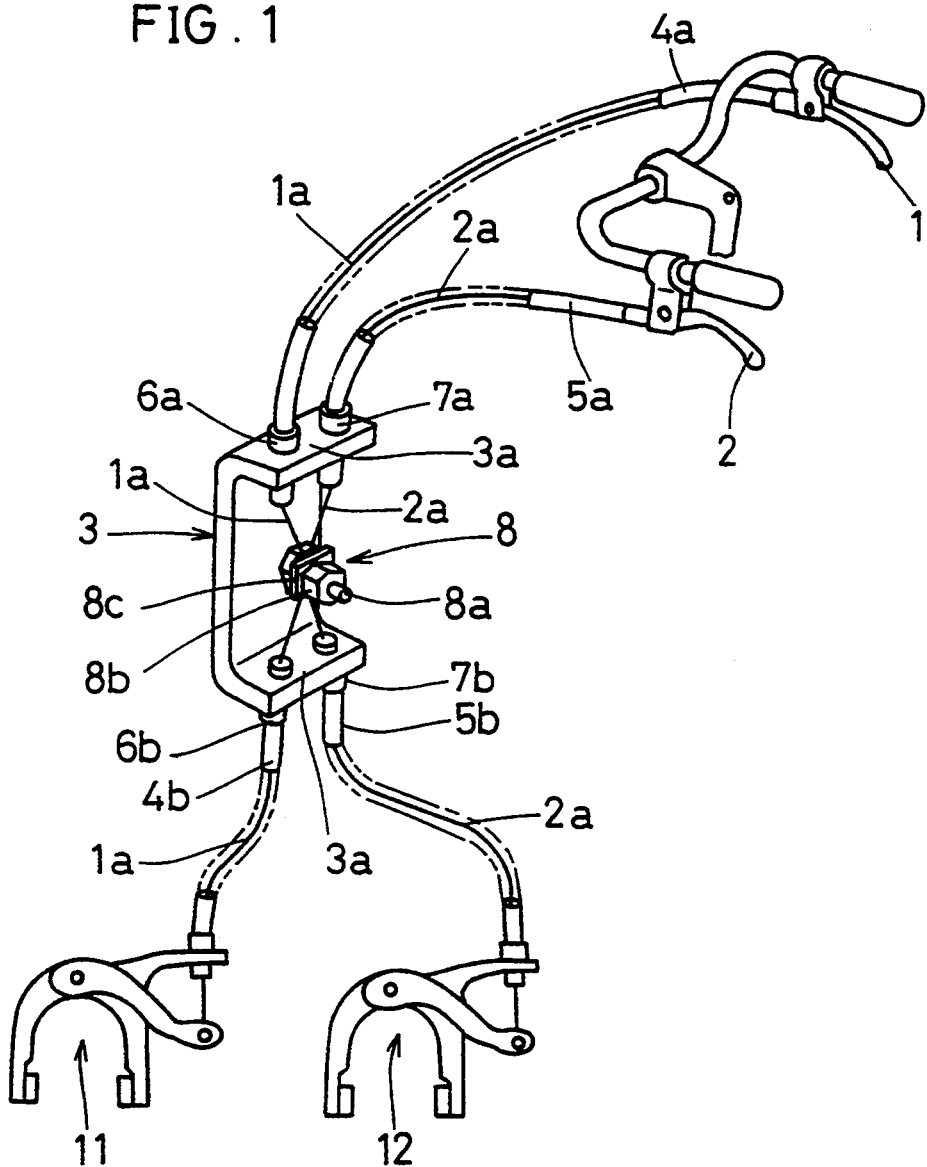
FIG. 1 is a perspective view showing an embodiment of the present invention.
Figure 4:
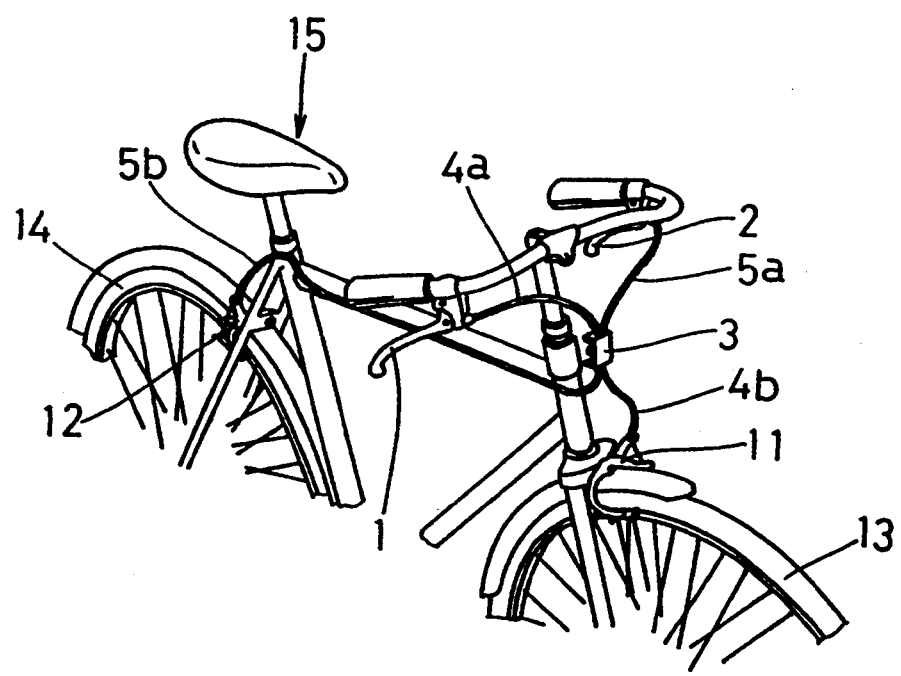
FIG. 4 is a perspective view of the upper portion of a bicycle equipped with the present invention.

In FIG. 1 and FIG. 4 reference numeral 1 designates a brake lever for a front wheel brake, 1a a brake wire, 11 a brake for the front wheel 13, 2 a brake lever for a rear wheel brake, 2a another single, uncut brake wire, 12 a brake for the rear wheel 14, the brake lever 1 and the brake 11 being connected by the wire 1a and the brake lever 2 and the brake 12 being connected by the wire 2a. Reference numeral 15 designates a bicycle equipped with a braking device according to the present invention.

Reference numeral 3 designates an outer tube relay, 4a and 4b outer tubes through which a wire 1a passes and 5a, 5b outer tubes through which a wire 2a passes. The outer tube relay 3 is a rectangular plate with both ends portions thereof bent at right angles, and the outer tubes 4a, 4b, 5a and 5b are connected to the bent portion 3a of the outer tube relay 3 via the outer tube receivers 6a, 6b, 7a and 7b connected to the relay 3 respectively. The relay 3 is, therefore, a means for connecting the outer tubes 4a and 4b on the one hand and the outer tubes 5a and 5b on the other, and the wires 1a and 1b are set to pass through the inside of this relay 3.

Figure 2:
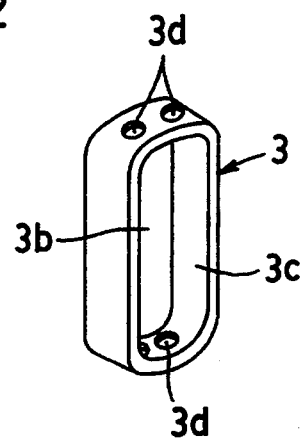
FIG. 2 is a perspective view of an outer tube relay of the embodiment in a different shape.

The outer tube relay 3 may as well be a lidless box-like one with its continuous side wall 3c around a bottom 3b as shown in FIG. 2. This alternative has an advantage of being higher in strength compared with that of FIG. 1. Reference numeral 3d designates each one connecting hole for the outer tube.

Figure 3A:
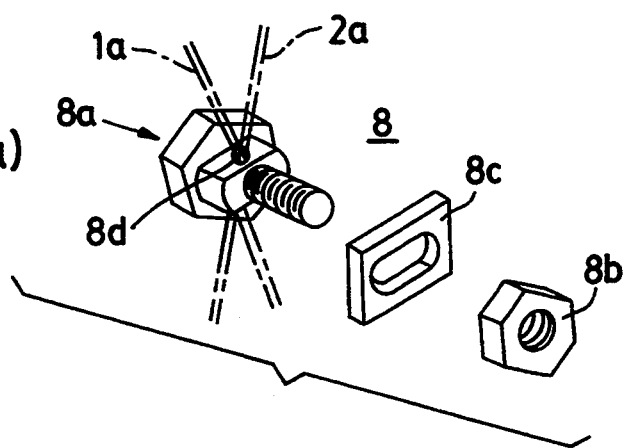
FIGS. 3(a) and 3(b) are perspective views of fixing means used in the embodiment.
Figure 3B:
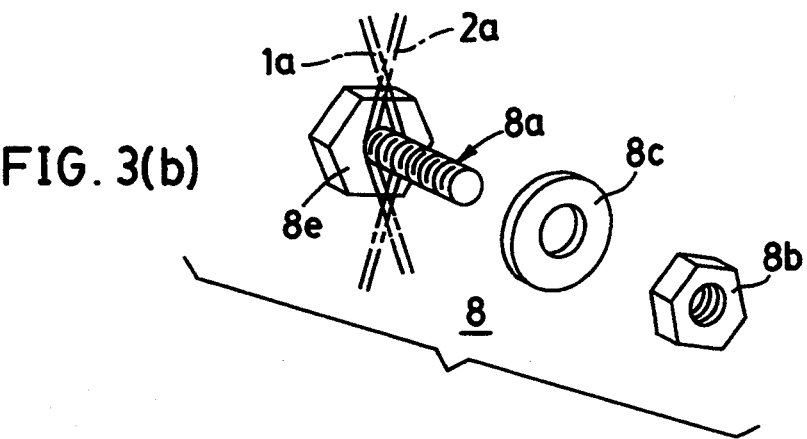

Reference numeral 8 designates a fixing means for fixing the wires 1a and 2a together inside the relay 3. As shown in FIG. 3(a), it is made up of a bolt 8a, a nut 8b and a pressing plate 8c having a rectangular hole therein and the bolt 8a has formed inward of its head a boss whose sectional shape is corresponding to that of the hole in the pressing plate 8c and this boss has a through hole 8d in the diametric direction. The wires 1a and 2a are to be set through this hole 8d before screwing up the nut 8b so that the wires 1a and 2a are fixed securely. The construction described above is a mere example and it is also possible to use a fixing means of different construction such as shown in FIG. 3(b) the bolt 8a has not boss and the wires 1a and 2a are set outward shaft and a nut 8b is screwed up to have the wires 1a and 2a fixed together between the head 8e and the pressing plate 8c. In particular, only the single brake wire 1a extends from the front brake lever 1 through the outer tube relay 3 without being cut to the front brake 11. Similarly, only the single brake wire 2a extends from the rear brake lever 2 through the outer tube relay 3 without being cut to the rear brake 12.

Fixing of the wires 1a and 2a by the use of the fixing means 8 is done after connecting the wires 1a and 2a between the brake lever 1 and the brake 11 or the brake lever 2 and the brake 12 respectively and subsequent adjustment of the wire length et cetera. In other words, after the single brake wires 1a and 2a are respectively connected from the front and rear brake levers 1 and 2 to the front and rear brakes 11 and 12 as described above, the braking force applied to each of the front and rear brakes 11 and 12 is adjusted to an optimum amount by independently adjusting each of the single brake wires 1a and 2a. When this adjustment is completed, the bolt 8a and nut 8b of the fixing means 8 are tightened together to directly connect together the brake wires 1a and 2a. Since the two brake wires 1a and 2a are directly connected together by the fixing means 8 within the outer relay 3, operation of one of the front and rear brake levers 1 and 2 simultaneously and without delay operates both the front and rear brakes 11 and 12. For example, operating front brake lever 1 pulls on brake wire 1a which actuates not only the front brake 11 but also simultaneously the rear brake 12 without delay. Since the adjustment can then be done independently, the brakes for the front and rear wheels can be adjusted optimally without affecting that of the brake for the other wheel and the work therefor is easy.

With the brake of the construction as described above when, for example, the brake lever 1 is manipulated, the wire 1a is pulled and the brake 11 is actuated. Since, however, the wires 1a and 2a are fixed together inside the relay 3, the wire 2a is directly pulled beyond thereof and the brake 12 is actuated, too. The same applies when the brake lever 2 is manipulated. Since the brakes 11 and 12 for both wheels 13 and 14 are thus linked, both front and rear wheels 13 and 14 are braked simultaneously, safely and quickly, even when only either brake lever is manipulable.

Then, the actuating conditions of the front and rear wheels depend on the independent adjustment done before fixing of the wires, and proper actuation of the brakes is feasible. If fixing of the wires by means of the fixing means 8 should be erroneous, the consequence is only failure to attain simultaneous braking, this not interfering with the individual function of the brakes, and safety is thus ensured.

What is claimed is:

1. A braking device for a bicycle comprising:
   a front brake lever provided on a handle bars of said bicycle;
   a rear brake lever provided on said handle bars of said bicycle;
   a front wheel brake for applying braking force to a front wheel of said bicycle;
   a rear wheel brake for applying braking force to a rear wheel of said bicycle;
   an outer tube relay provided on said bicycle, said outer tube relay comprising a rectangular plate with end portions of said rectangular plate bent at right angles and holes provided in each of said bent portions;
   a single front brake wire extending from said front brake lever to said front wheel brake, said front brake wire comprising a single, uncut inner wire connected at one end to said front brake lever and at another end to said front wheel brake and passing uncut through said holes in said outer tube relay and an outer tube covering of said inner wire which extends from said front brake lever to said front wheel brake and is divided by said outer tube relay such that said inner wire is exposed within said outer tube relay;
   a single rear brake wire extending from said rear brake lever to said rear wheel brake, said rear brake wire comprising a single, uncut inner wire connected at one end to said rear brake lever and at another end to said rear wheel brake and passing uncut through said holes in said outer tube relay and an outer tube extending from said rear brake lever to said rear wheel brake and divided by said outer tube relay such that said inner wire is exposed within said outer tube relay; and
   a fixing means for directly fixing together said exposed inner wires of said front and rear brake wires within said outer tube relay so that the inner wires of said front and rear brake wires are directly connected together and operating force applied to either said front brake lever or said rear brake lever is directly transmitted from one of said front and rear brake wires to an other of said front and rear brake wires to simultaneously actuate the front and rear brakes without delay whenever either said front brake lever or said rear brake lever is operated, said fixing means comprising a bolt and a nut and said inner wires of said front and rear brake wires are placed between a head of said bolt and said nut and directly connected together by screwing together said nut and said bolt whereby the brake force can be applied to the front and rear wheels simultaneously without delay.

2. A braking device for a bicycle comprising:
   a front brake lever provided on a handle bars of said bicycle;
   a rear brake lever provided on said handle bars of said bicycle;
   a front wheel brake for applying braking force to said front wheel of said bicycle;
   a rear wheel brake for applying braking force to a rear wheel of said bicycle;
   an outer tube relay provided on said bicycle, said outer tube relay comprising a lidless box having a continuous side wall around a bottom and holes provided in opposing walls of said continuous side walls;
   a single front brake wire extending from said front brake lever to said front wheel brake, said front brake wire comprising a single uncut inner wire connected at one end to said front brake lever and at another end to said front wheel brake and passing uncut through said holes in said outer tube relay and an outer tube covering of said inner wire which extends from said front brake lever to said front wheel brake and is divided by said outer tube relay such that said inner wire is exposed within said outer tube relay;
   a single rear brake wire extending from said rear brake lever to said rear wheel brake, said rear brake wire comprising a single, uncut inner wire connected at one end to said rear brake lever and at another end to said rear wheel brake and passing uncut through said holes in said outer tube relay and an outer tube extending from said rear brake lever to said rear wheel brake and divided by said outer tube relay such that said inner wires exposed in said outer tube relay; and a fixing means for directly fixing together said exposed inner wires of said front and rear brake wires within said outer tube relay so that the inner wires of said front and rear brake wires are directly connected together and an operating force applied to either said front brake lever or said rear brake lever is directly transmitted from one of said front and rear brake wires to another of said front and rear brake wires to simultaneously actuate the front and rear brakes without delay whenever either said front brake lever or said rear brake lever is operated, said fixing means comprising a bolt and a nut and said inner wires of said front and rear brake wires are placed between a head of said bolt and said nut and directly connected together by screwing together said nut and said bolt whereby the brake force can be applied to the front and rear brakes simultaneously without delay.

* * * * *